Nov. 24, 1953                P. H. CARQUILLAT                2,660,375
                      PHOTOGRAPHIC EXPOSURE CALCULATOR
Filed Nov. 30, 1949                                    3 Sheets-Sheet 1

INVENTOR
PIERRE HENRI CARQUILLAT
BY
A. John Michel
ATTORNEY

Nov. 24, 1953 P. H. CARQUILLAT 2,660,375
PHOTOGRAPHIC EXPOSURE CALCULATOR
Filed Nov. 30, 1949 3 Sheets-Sheet 2

INVENTOR
PIERRE H. CARQUILLAT
BY T. R. O'Malley
ATTORNEY

Nov. 24, 1953     P. H. CARQUILLAT     2,660,375
PHOTOGRAPHIC EXPOSURE CALCULATOR
Filed Nov. 30, 1949     3 Sheets-Sheet 3
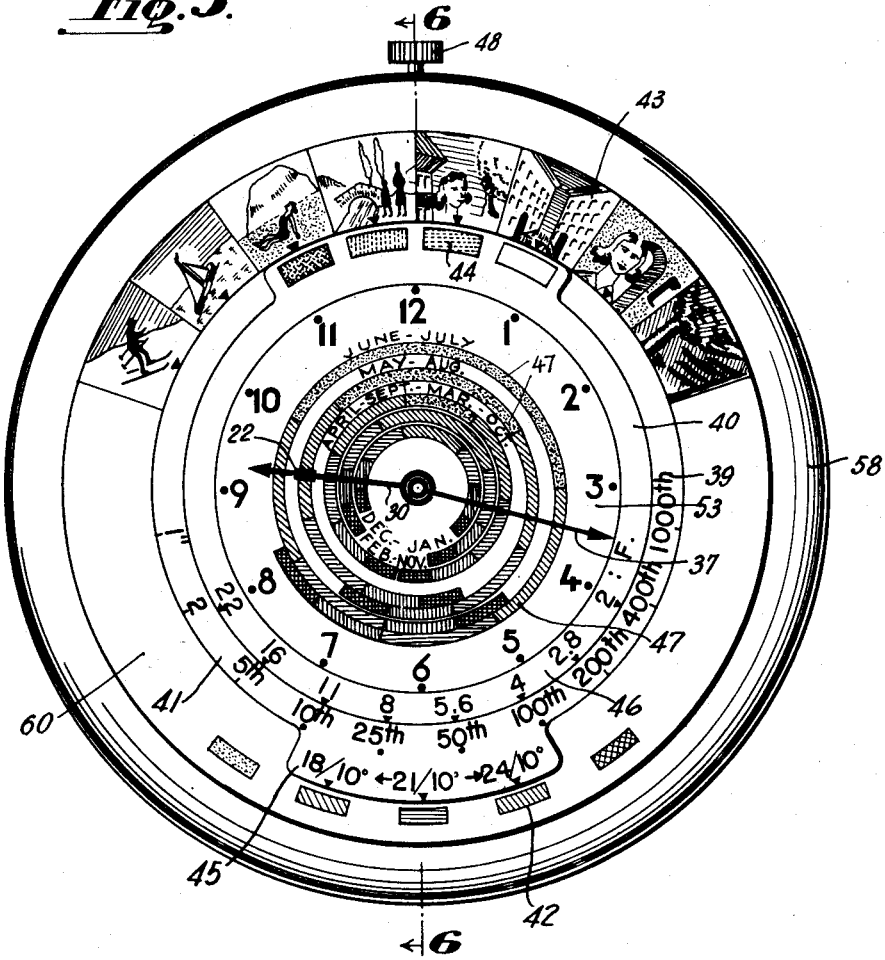
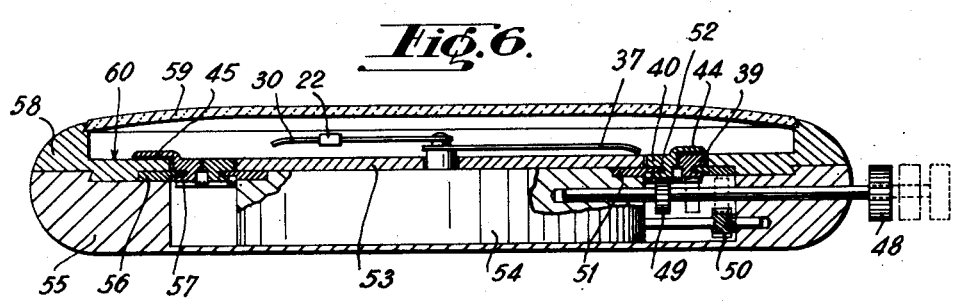
INVENTOR
PIERRE HENRI CARQUILLAT
BY *A. John Michel*
ATTORNEY Patented Nov. 24, 1953

2,660,375

UNITED STATES PATENT OFFICE 2,660,375

PHOTOGRAPHIC EXPOSURE CALCULATOR

Pierre Henri Carquillat, Monthey, Switzerland

Application November 30, 1949, Serial No. 130,325

Claims priority, application Switzerland December 8, 1948

10 Claims. (Cl. 235—64.7)

The present invention relates to an exposure indicator for the taking of photographs in daylight. Such indicators are known but their use must be adapted to the season and the hour in which photographs are to be taken.

Known indicator devices comprising a graduated scale, movable with respect to another scale and comprising auxiliary tables, or an assembly of indicator tables are difficult to read and, therefore, of little practical use.

Other known apparatus, such as exposure meters, also make it necessary to read tables showing, for each lighting value and each value of sensitiveness of the emulsion used, the period of exposure to be chosen in terms of the aperture of the lens: the reading of the same is therefore also not direct, and such devices are delicate and cumbersome.

It is the principal object of the present invention to provide an improved indicator, which can be easily manipulated, clearly read and which provides exact indications in all seasons and at any hour. The above object and various advantages are accomplished in accordance with this invention by providing an exposure indicator to facilitate the taking of photographs in daylight comprising a chart including a watch-like dial having marks corresponding to the hours of the day and a plurality of plots divided into segments and arranged concentrically on said dial, each of these plots corresponding to a given period of the year and each of the segments of each plot indicating the average lighting at a predetermined latitude, for the period of the year to which this plot corresponds and for the period of the day with which this segment registers on said dial, said chart serving to provide the value of a first parameter corresponding to the prevailing average lighting, and a device for obtaining the value of one of two setting parameters comprising the period of exposure and the aperture of the lens, taking into account the chosen value of one of these parameters and the values of three additional parameters characteristic, respectively, of the subject to be photographed, the condition of the atmosphere and the sensitiveness of the emulsion used, said device comprising a stationary part and a rotatable part concentric therewith, each of said parts carrying plots corresponding to at least two of said parameters; and means for rotating said rotatable part with respect to the stationary part so as to bring the chosen value of the parameters into registration and to obtain thereby the value of the said one of the setting parameters.

The accompanying drawing shows, by way of example, two embodiments of the indicator of the invention.

Fig. 5 is a general front view of a second embodiment of the invention; and

Fig. 6 is an elevation, partly in cross-section, along line 6—6 of Fig. 5.

Figure 1:
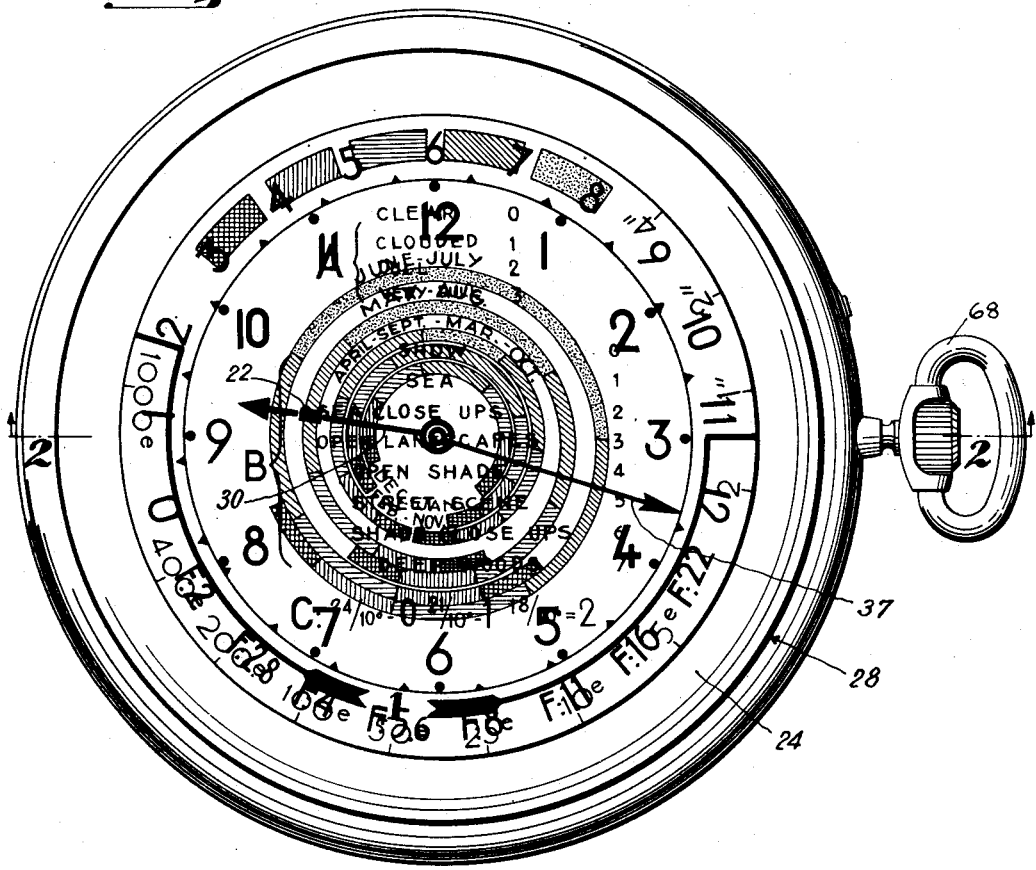
Fig. 1 is a general front view of one embodiment of the invention.
Figure 2:
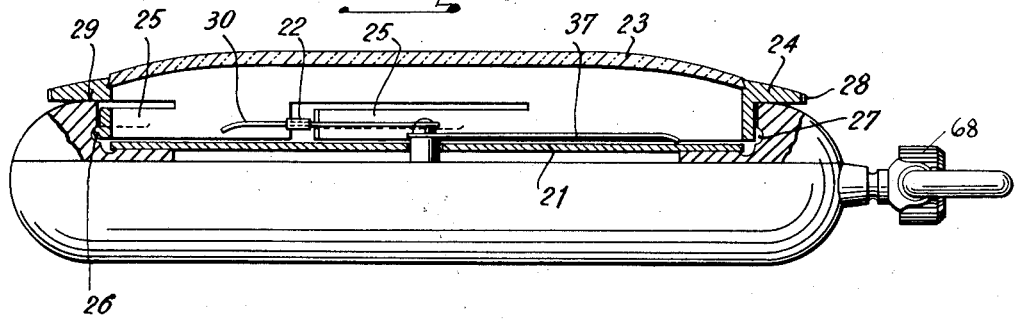
Fig. 2 is an elevation of Fig. 1, along line 2—2 thereof, partly in cross-section.
Figure 3:
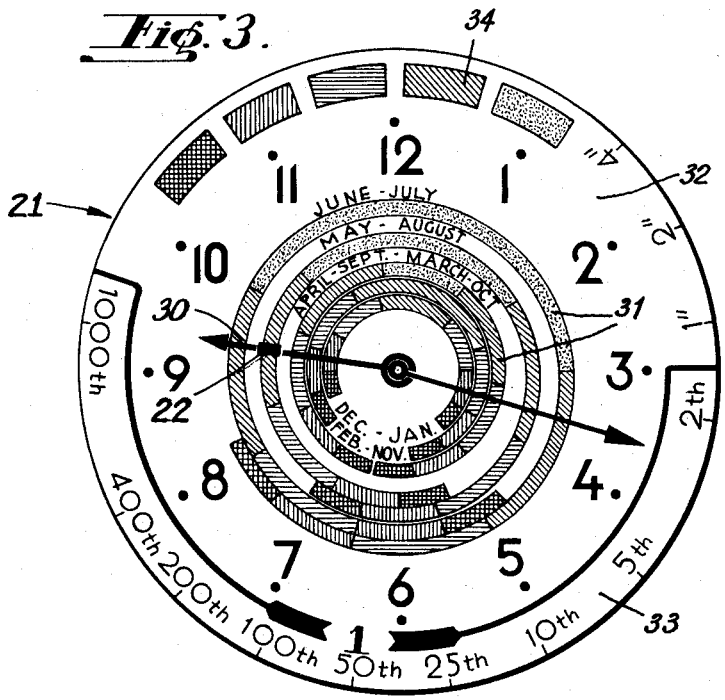
Fig. 3 shows the stationary part of the indicator of Fig. 1.
Figure 4:
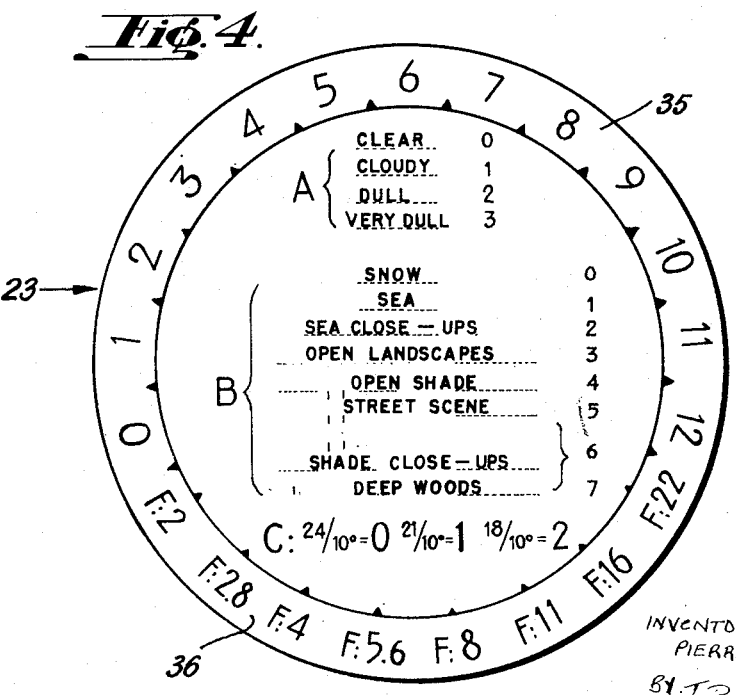
Fig. 4 shows the movable plots and tables forming part of the corrector device of the indicator of Fig. 1.

Referring now to Figures 1 to 4 of the drawing, there is shown an exposure indicator combined with a pocket watch in accordance with one embodiment of the invention. This device comprises a dial 21 (see Fig. 3), carrying plots 31, 32, 33 and 34, which will be described further hereinafter. A marker 22 is slidably arranged on the hour-hand 30. Watch crystal 23 is rotatable in relation to the dial and carries the indicia of the so-called corrector device, as shown in Fig. 4, and hereinafter further explained. This crystal is serrated in a rotatable collar 24 which is held in the watch casing by means of lugs 25. The lugs are cut in a cylindrical part of collar 24 and bent outwardly. Each of the lugs has a rib 26 which cooperates with an annular groove 27 of the watch casing to hold the collar tightly pressed against upper face 29 of the casing. Collar 24 with crystal 23 can be removed from the casing, for instance by means of a knife or other sharp instrument. The collar and crystal are rotatable, the outer periphery of the collar being knurled, as shown at 28.

Referring more specifically to Fig. 3, hour plots 31 are arranged concentrically on the watch dial, each of said plots comprising differently shaded segments corresponding to various lighting values. Around these indicia, there is arranged the usual hour scale 32 of a watch dial. Concentrically and outside the hour marks are shown: at 33, plots showing different periods of exposure, and at 34, rectangular guide marks shaded in the same manner and in a corresponding way to the different segments of the hour plots. Plots 33 and 34 form a so-called guide scale. Hands 30 and 37 on the dial are actuated by watch winder 68 but it is understood that they may also be actuated by a knurled knob, or any other means equivalent to a winder. Fig. 4 shows, at A, B and C, three tables which may be engraved on the glass protecting the dial and which form a corrector device. Table A is designed to provide the correction, taking into account the condition of the sky. It includes four numerals from 0 to 3 and corresponding to an arbitrary scale of four different conditions of the sky, i. e. clear, cloudy, dull and very dull, respectively. A table B is designed to provide the necessary correction, taking into account the subject to be photographed. It comprises a list of characteristic subjects, chosen at will, and, opposite each of these eight subjects, is to be found a correction figure from 0 to 7. As shown in Fig. 4, these subjects are: snow, sea, sea close-ups, open landscapes, open shade, street scene, shade close-ups, deep woods. A table C is designed to provide the necessary correction according to the sensitiveness of the emulsion used. This table carries the indication of three usual sensitivenesses of emulsion, opposite each of which is placed a figure from 0 to 2. At 35, there is shown a movable scale of numerals, running from 0 to 12. Movable scale 35 is arranged on a ring or a mounting in which is embedded the glass bearing the tables A, B, and C. This movable scale also carries, at 36, indications characteristic of the aperture of a lens. In accordance with a normal notation, the aperture of the lens is indicated by the focal distance divided by the diameter of the aperture of the lens; the smallest figure therefore corresponds to the largest aperture.

When it is desired to ascertain the necessary aperture of the lens in order to photograph or film a given subject at a specified hour and season, with a known period of exposure and under determined conditions of lighting, the procedure is as follows: if the indicator is combined with a watch, the hour hand of the latter will show directly the segment of the hour plots 31 to be taken as a guide on the guide scale 34. This segment will be determined by that plot which corresponds to the actual month or season of the year. The slidable marker 22 on the hour hand is helpful for rapidly identifying the desired plot. It can be set periodically after removing collar 24 with glass 23 by positioning it over the plot marked June-July, or May-August, or April-September-March-October, or December-January, or February-November, according to the time of the year. The corrector device will then be consulted: from table A, for example, will be taken the numeral 2 corresponding to a dull sky; from table B, there is taken the numeral 1 corresponding to a sea subject; from table C, there is taken the numeral 1 corresponding to an emulsion having a sensitiveness of 21/10 degrees D. I. N. The three numerals are added, 2+1+1=4, and the sum will be the guiding figure on the movable scale 35. This scale is then rotated until the guiding figure registers with the rectangular guide mark of the guide scale 34 corresponding to the actual month and hour, for example to the central guide mark, shaded horizontally. The necessary aperture of the lens can then be read directly opposite the period of exposure to be used. For example, if a photograph is to be taken with a period of exposure of 1/25 of a second, it will be seen that an aperture of about $F=11$ must be chosen.

Referring now to Figs. 5 and 6, showing a preferred embodiment of the invention, there is shown a device having the outer appearance of a watch and comprising two hands 30 and 37. However, the hands of this device are not controlled by a clock work but are set manually by means of knob 48 by pulling it into an outer position in which a pinion 49 secured to the shaft of this knob cooperates with a driving pinion 50 for actuating the hands which are geared to one another. In a central position, the knob 48 is adapted to actuate an outer movable ring 39 and in its inner position it is adapted to actuate an inner movable ring 40. Each of these rings comprises a rack arranged on its lower surface and adapted to cooperate with pinion 49 attached to the knob shaft. Inner ring 40 is rotatably mounted on a split ring 51 which has been compressed and has then expanded into an annular groove 52 of ring 40. Resilient ring 51 is secured between a watch dial 53 and a mounting bridge 54 secured in the casing 55 of the indicator. Inner ring 40 carries plots 44 consisting of four differently colored or shaded rectangles and corresponding to arbitrary values of a parameter characteristic of the condition of the sky. Inner ring 40 also carries markings 46 corresponding to the different apertures of the lens. Outer rotatable ring 39 is mounted on a split ring 56 which has been expanded and has retracted into an annular groove 57 of ring 39 and which is secured between collar 58 and the casing 55. Collar 58 carries the glass 59 protecting the dial face of the indicator. Outer ring 39 carries plots 41 corresponding to the different periods of exposure and markings 45 corresponding to the different sensitiveness of the usual emulsions. An inner flange 60 of collar 58 comprises fixed plots 43 consisting of eight conventional drawings representing characteristic subjects, and plots 42 consisting of differently colored or shaded guides corresponding to those of the hour plots sectors, similar to the first-described embodiment. Plots 44, 43 and 45 correspond, respectively, to tables A, B and C of the first embodiment. Each of them comprises a different series of indications and all three together form a corrector device.

The method of operation of this indicator is as follows: the hands are first set in the position corresponding to the hour by means of winder 48. In registration with hour hand 30 and on the particular segment of plots 47 corresponding to the month of the year, note is taken of the color or shading corresponding to the lighting value for the specified season and hour. Winder 48 is then pushed into its center position to actuate ring 39 and to register the guide mark of plots 45 corresponding to the sensitiveness of the emulsion with the colored or shaded guide mark of plots 42 corresponding to the color of the chosen segment of plots 47. The winder 48 is then brought into its innermost position to actuate the inner ring and to register the colored or shaded guide mark of plots 44 corresponding to the condition of the sky with the illustration of plots 43 corresponding to the subject to be photographed. The necessary opening of the lens may be read on plots 46 opposite the chosen period of exposure indicated on plots 41.

It is to be understood that the hands of the second embodiment of the indicator may also be driven by a clock work inside the casing 55, as are those of the first embodiment. In this case, the driving pinion 50 could be alternatively coupled to means for winding up the clock work and to a gear wheel mounted on the axle of the minute hand by means of a pusher protruding at the side of the casing and similar to those of known stop watches and of old-fashioned pocket watches. A separate winder could also be used for winding up the clock work and for setting the hands while knob 48 would only be used to set the indicator plots and would have only two operating positions, the driving pinion 50 being entirely omitted. All these winding and setting mechanisms are well known in the art of clock making and, forming no part of the invention, are neither shown nor described in detail.

What I claim is:

1. An exposure-indicating arrangement to facilitate the taking of photographs in daylight comprising: a chart including a watch-like dial having marks corresponding to the hours of the day and a plurality of plots divided into segments and arranged concentrically on said dial, each of these plots corresponding to a given period of the year and each of the segments of each plot indicating the average lighting at a predetermined latitude, for the period of the year to which this plot corresponds and for the period of the day with which this segment registers on said dial, said chart serving to provide the value of a first parameter corresponding to the prevailing average lighting, and a device for obtaining the value of one of two setting parameters comprising the period of exposure and the aperture of the lens, taking into account the chosen value of one of these two parameters and the values of three additional parameters characteristic, respectively, of the subject to be photographed, the condition of the atmosphere and the sensitiveness of the emulsion used, said device comprising a stationary part and a rotatable part concentric therewith, each of said parts carrying plots corresponding to at least two of said parameters; and means for rotating said rotatable part with respect to the stationary part so as to bring the chosen values of the parameters into registration and to obtain thereby the value of the said one of the setting parameters.

2. An arrangement as defined in claim 1, comprising an indicating hour hand mounted on said dial and manual means adapted selectively to actuate said hour hand and said rotatable part; said hour hand, when set to time on said dial, registering with the segment indicating the then prevailing average lighting, on the plot corresponding to the selected period of the year.

3. An arrangement as defined in claim 1, wherein said segments are differently shaded for indicating different values of the said average lighting, and wherein one of the said plots on one of the said concentric parts comprises marks of different shades corresponding respectively to the different shades of the said segments.

4. An exposure-indicating arrangement to facilitate the taking of photographs in daylight comprising: a chart including a watch-like dial having marks corresponding to the hours of the day and a plurality of plots divided into segments and arranged concentrically on said dial, each of these plots corresponding to a given period of the year and each of the segments of each plot indicating the average lighting at a predetermined latitude, for the period of the year to which this plot corresponds and for the period of the day with which this segment registers on said dial, said chart serving to provide the value of a first parameter corresponding to the prevailing average lighting, and a device for obtaining the value of one of two setting parameters comprising the period of exposure and the aperture of the lens, taking into account the chosen value of one of these two parameters and the values of three additional parameters characteristic, respectively, of the subject to be photographed, the condition of the atmosphere and the sensitiveness of the emulsion used, said device comprising tables carrying each numerals corresponding to predetermined values of one of the said additional parameters; a stationary part and a rotatable part concentric therewith, each of said parts carrying plots corresponding to at least two of the said parameters, one of said plots consisting of numerals corresponding to the possible totals of a set of numerals comprising one of the numerals of each of said tables; and means for rotating said rotatable part in respect of said stationary part so as to bring the chosen values of the parameters and numerals into registration and to obtain thereby the value of the said one of the setting parameters.

5. An exposure indicator to facilitate the taking of photographs in daylight comprising: a casing, a chart including a watch-like dial mounted in said casing and having marks corresponding to the hours of the day and a plurality of plots divided into segments and arranged concentrically on said dial, each of these plots corresponding to a given period of the year and each of the segments of each plot indicating the average lighting at a predetermined latitude, for the period of the year to which this plot corresponds and for the period of the day with which this segment registers on said dial, said chart serving to provide the value of a first parameter corresponding to the prevailing average lighting, an indicating hour hand mounted on said dial, manual means for actuating said hour hand, a glass covering said dial and hour hand, and a device for obtaining the value of one of two setting parameters comprising the period of exposure and the aperture of the lens, taking into account the chosen value of one of these two parameters and the values of three additional parameters characteristic, respectively, of the subject to be photographed, the condition of the atmosphere and the sensitiveness of the emulsion used, said device comprising tables carrying each numerals corresponding to predetermined values of one of the said additional parameters; a stationary part and a rotatable part concentric with the dial, each of said parts carrying plots corresponding to at least two of the said parameters, one of said plots consisting of numerals comprising one of the numerals of each of said tables; and means for rotating said rotatable part in respect of said stationary part so as to bring the chosen values of the parameters and numerals into registration and to obtain thereby the value of the said one of the setting parameters, and said hour hand, when set to time on said dial, registering with the segment indicating the prevailing average lighting, on the plot corresponding to the selected period of the year.

6. An exposure indicator as defined in claim 5, wherein said dial comprises said stationary part, said glass comprising said rotatable part and being secured to a rotatable ring mounted around the dial in said casing.

7. An exposure indicator as defined in claim 6, wherein said casing also carries the said tables.

8. An exposure indicator to facilitate the taking of photographs in daylight comprising: a chart including a watch-like dial having marks corresponding to the hours of the day and a plurality of plots divided into segments and arranged concentrically on said dial, each of these plots corresponding to a given period of the year and each of the segments of each plot indicating the average lighting at a predetermined latitude, for the period of the year to which this plot corresponds and for the period of the day with which this segment registers on said dial, said chart serving to provide the value of a first parameter corresponding to the prevailing average lighting; and a device for obtaining the value of one of two setting parameters comprising the period of exposure and the aperture of the lens, taking into account the chosen value of one of these two parameters and the values of three additional parameters characteristic, respectively, of the subject to be photographed, the condition of the atmosphere and the sensitiveness of the emulsion used, said device comprising a stationary part and two concentrically arranged rotatable rings, each of said part and rings carrying two plots corresponding respectively to the values of two of the said parameters; and means for rotating and rotatable rings in respect of said stationary part so as to bring the selected values of the parameters into registration and to obtain thereby the value of the said one of the setting parameters.

9. An exposure indicator as defined in claim 8, comprising a casing in which said dial is mounted, an hour hand mounted on said dial, manual means for actuating said hour hand, and a glass covering said dial, hour hand, stationary part and rotatable rings, the stationary part and the rotatable rings being arranged concentrically around the dial and the said manual means being adapted selectively to actuate the hour hand and the rotatable rings.

10. An exposure indicator as defined in claim 8, wherein one of the said plots, which corresponds to the subject to be photographed, comprises conventional miniature drawings representing typical such subjects and another of said plots comprises marks of different brightnesses representing different conditions of the atmosphere.

PIERRE HENRI CARQUILLAT.

References Cited in the file of this patent

UNITED STATES PATENTS

| Number | Name | Date |
|---|---|---|
| 215,133 | King | May 6, 1878 |
| 658,258 | Hagey | Sept. 18, 1900 |
| 659,727 | Brown | Oct. 16, 1900 |
| 661,096 | Wilkinson et al. | Nov. 6, 1900 |
| 725,807 | Watkins | Apr. 21, 1903 |
| 871,087 | Goughnour | Nov. 12, 1907 |
| 886,189 | Crouch | Apr. 28, 1908 |
| 901,655 | Simpkin | Oct. 20, 1908 |
| 1,039,245 | Bishop | Sept. 24, 1912 |
| 1,041,765 | Fors | Oct. 22, 1912 |
| 1,715,270 | Bassett | May 28, 1929 |
| 1,996,828 | Peabody | Apr. 9, 1935 |
| 2,284,783 | Weaver | June 2, 1942 |
| 2,287,430 | Kende et al. | June 23, 1942 |
| 2,343,257 | Hineline | Mar. 7, 1944 |
| 2,436,966 | Legris | Mar. 2, 1948 |

FOREIGN PATENTS

| Number | Country | Date |
|---|---|---|
| 487,685 | Germany | Dec. 31, 1929 |